Figure 1:
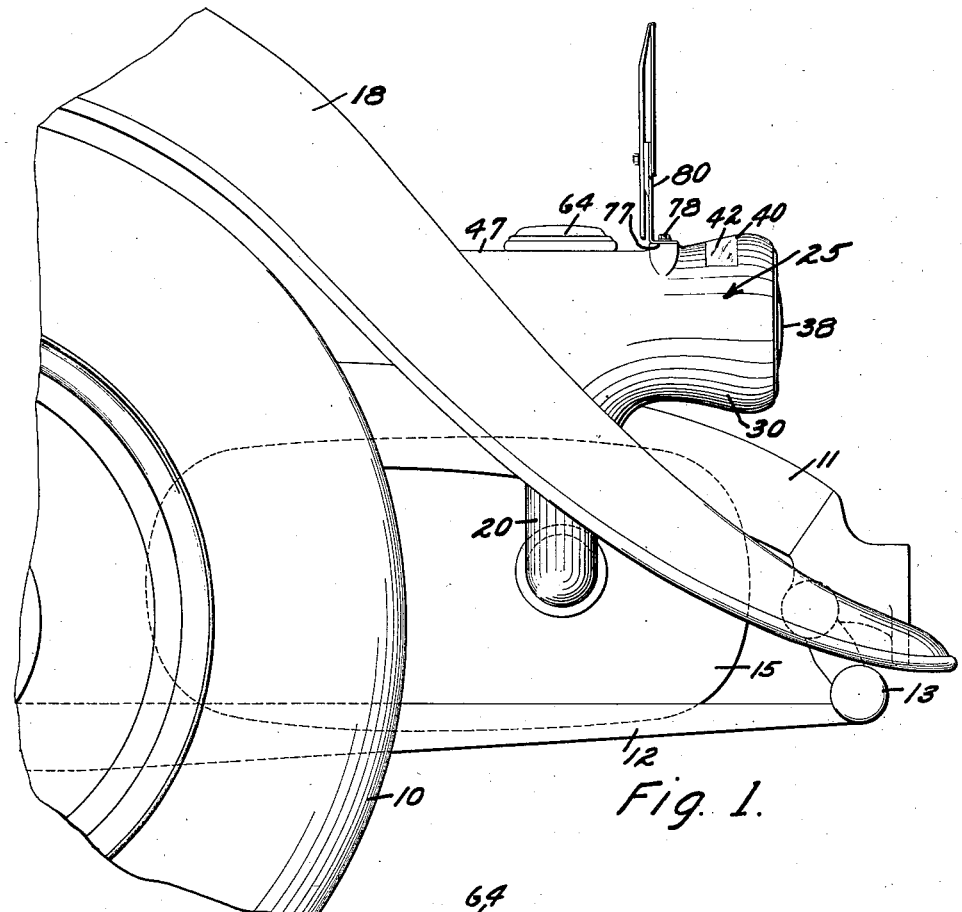

April 25, 1933. W. A. RADKE 1,905,568

TAIL LAMP FIXTURE

Filed Sept. 19, 1932

INVENTOR.
William A. Radke
BY
ATTORNEY

Patented Apr. 25, 1933

1,905,568

UNITED STATES PATENT OFFICE

WILLIAM A. RADKE, OF SOUTH BEND, INDIANA, ASSIGNOR TO THE STUDEBAKER CORPORATION, OF SOUTH BEND, INDIANA, A CORPORATION OF NEW JERSEY

TAIL LAMP FIXTURE

Application filed September 19, 1932. Serial No. 633,805.

This invention relates to a combined tail lamp, rear fender tail lamp mounting and gasoline tank filler spout for an automotive vehicle, and particularly to a tail lamp mounting combined with a gasoline tank filler spout and rear fender, and has for its principal object the provision of a tail lamp combined with a tail lamp mounting which will firmly secure the tail lamp upon the rear fender of an automobile and at the same time conceal a portion of a gasoline tank filler spout projecting through the rear fender and above the upper surface of the same.

A further object is the provision of a tail lamp and tail lamp mounting within which the upper end of a gasoline tank filler spout may be resiliently mounted to support the upper end of the spout to prevent movement or bending thereof during the process of filling the gasoline tank and to prevent vibration or rattling thereof.

A still further object lies in the provision of a combined tail lamp and tail lamp mounting which will support and conceal the upper end of a gasoline tank filler spout and which at the same time is so constructed that there will be no danger of spilled gasoline coming in contact with the wiring system of the tail lamp.

It is also an object to provide a device of the character described which is neat and attractive in appearance, which is simple and economical to manufacture and install, and which is so ruggedly constructed that it will not readily get out of order in use.

Other objects and advantages of the invention will appear as the description proceeds.

The accompanying drawing shows a preferred mechanical embodiment of the idea of the invention. The drawing, however, is not to be taken as limiting the invention and it is to be understood that such changes in the size, shape and arrangement of the parts may be made as come within the scope of the sub-joined claims.

In the drawing:

Figure 1 is a vertical elevational view of a fragmentary portion of the rear part of an automotive vehicle showing a portion of the rear wheel, rear fender, rear end of the frame and a portion of one rear spring, a gasoline tank, a gasoline tank filler spout projecting through the rear fender, and a combined tail light and tail light mounting constructed according to the idea of this invention, mounted upon the rear fender, surrounding the projecting end of the gasoline tank filler spout.

Figure 2:
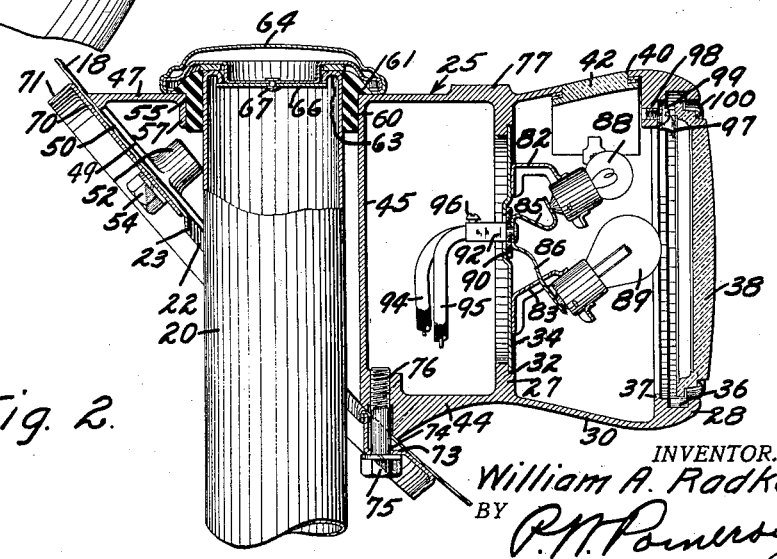

Figure 2 is a vertical sectional view of a combined tail light and tail lamp mounting constructed according to the idea of this invention showing a portion of a gasoline tank filler spout projecting therethrough.

Referring to the drawing in detail, the numeral 10 indicates a rear road wheel of the vehicle to which the device of the invention is applied. A frame 11 is supported upon the wheel by a spring 12 and shackle connections 13, and carries a gasoline tank 15 and a rear fender 18. A gasoline tank filler spout 20 is secured to one end of the gasoline tank 15 and extends outwardly from the end of the gasoline tank for a short distance and then is bent upwardly at right angles and extends through an aperture 22 illustrated in Figure 2, provided in the rear fender and projects at its upper end above the top surface of the rear fender 18.

Around the aperture 22 the rear fender is provided with a downwardly bent flange 23, and a tail lamp fixture generally indicated at 25 is mounted on the rear fender surrounding the aperture 22 and the upwardly projecting end of the gasoline tank filler spout 20.

In the member 25 a tail lamp body and lamp mounting are formed as an integral unit. The portion of the unit forming the lamp body comprises two spaced parallel flanges 27 and 28 connected by an annular portion 30. The inner flange 27 is provided with an annular cut-out portion or shoulder 32 within which is secured a circular disk or diaphragm 34 adapted to carry the illuminating unit for the lamp, and the outer flange 28 is provided with an annular groove 36 and an annular shoulder 37 adapted to support a lens or glass closure 38. The upper portion of the annular portion 30 is provided with an elongated aperture 40 adapted to receive an upwardly projecting portion of a lens 42 to provide a license plate illuminating window in the lamp body. The lamp mounting portion is formed integrally with the lamp body and comprises an annular portion 44 disposed on the opposite side of the flange 27 from the annular portion 30. This annular portion 44 terminates with a partition 45 which is parallel to the flanges 27 and 28. That portion of the lamp mounting upon the opposite sides of the partition 45 from the lamp body is triangular in section and comprises an extension 47 along the top of the lamp and an angularly disposed portion 49 extending from the extremity of the extension 47 at the top of the lamp to the point of intersection of the partition 45 and the annular portion 44 at the bottom of the lamp. This angular portion 49 is slightly curved and adapted to closely follow the contour of the fender upon which the lamp is mounted, and is provided with a mounting flange 50 upon which integral bosses 52 are formed at spaced intervals. The bosses 52 are apertured and the apertures are screw-threaded to receive the threaded ends of stub bolts 54 by means of which the lamp mounting is secured to the fender. The triangular portion of the lamp mounting on the opposite side of the partition 45 from the lamp body is provided in the top thereof with a circular aperture 55 surrounded by a downwardly extending flange 57. As illustrated in Figure 2 the upper end of the gasoline tank filler spout extends through the triangular portion of the lamp mounting and through the aperture 55 to a plane slightly above the plane of the upper surface of the lamp mounting. A rubber bushing 60 having a laterally extending flange 61 thereon is disposed surrounding the upper end of the filler spout between the filler spout and the flange 57 with the bushing flange 61 resting upon the upper surface of the lamp mounting. This rubber bushing provides an anti-rattle connection between the top of the gasoline tank filler spout and the lamp mounting.

From a further inspection of Figure 2 it will be observed that the top edge of the filler spout is beaded over as at 63 to form an internal flange in the upper end of the filler spout, and that the filler spout cap 64 is secured upon the end of the filler spout by means of a flat spring 66 centrally secured to a downwardly extending portion of the filler cap as at 67 and having its ends extending beneath the bead 63.

A plate 70 having a downwardly bent stiffening flange 71 is applied to the underside of the fender 18 opposite the angularly disposed portion of the lamp mounting. This plate is provided with apertures for the stud bolts 54 and adjacent to one edge thereof is provided with an angularly bent portion 73. An aperture 74 is provided in this angularly bent portion and a stub bolt 75 extends through the aperture and has its end received in a screw threaded aperture 76 provided in the lamp mounting adjacent to the point at which the vertical partition 45 joins the annular portion 44 at the bottom of the lamp housing.

An extension 77 having a flanged horizontal upper surface is provided on the top of the annular portion 44 adjacent to the flange 27. This extension is provided with spaced screw-threaded apertures, not illustrated, into which extend stud bolts 78 which secure a license plate supporting bracket 80 to the upper surface of the lamp housing as illustrated in Figure 1.

While various forms of illuminating units may be used with my improved tail lamp and tail lamp mounting, I have illustrated in Figure 2, two spaced bulb sockets 82 and 83 secured to the diaphragm 34 by riveting, welding or other suitable means. Two springs 85 and 86 extend beneath the bulb receiving portions of the sockets 82 and 83 and constitute the return leads from the lamp bulbs 88 and 89. These springs 85 and 86 are mounted upon the diaphragm 34 but are insulated therefrom by a piece of insulating material 90. This insulating material 90 carries wire terminals, one of which is illustrated at 92, and current conducting wires 94 and 95 are secured to the wire terminals by means of set screws, one of which is illustrated at 96.

The current conducting wires 94 and 95 enter the lamp housing in the space between the partition 45 and the diaphragm 34 and are separated by the partition 45 from the filler spout 20 so that there will be no possibility of gasoline or gasoline vapors leaking through or overflowing the filler spout coming in contact with the lighting wires.

In the form of the invention illustrated in Figure 2, the bulb 88 is the tail lamp illuminating bulb and the bulb 89 is a signal or stop light bulb operated only when the vehicle upon which the lamp is mounted is being brought to a stop.

In Figure 2 of the drawing, I have particularly illustrated a satisfactory method of securing the lens 38 in the lamp housing which comprises abutment springs, one of which is indicated at 97, secured to apertured lugs 98 by suitable means such as the screw indicated at 99 for resiliently supporting the inner surface of the lens, and a clamp ring 100 interposed between the outer edge of the lens and one edge of the groove 36. It is to be understood, however, that I may use other convenient and desirable forms of lens mountings in combination with the improved tail lamp and tail lamp mounting described above.

From the above description it will be observed that I have provided a combined tail lamp, tail lamp support and gasoline tank filler spout support performing the objects set forth elsewhere in this specification. While I have shown a particular mechanical embodiment of the idea, it is to be understood that various changes in the shape, size and arrangement of the parts may be made without departing from the scope of the invention as set forth in the sub-joined claims.

Having now described by invention so that others skilled in the art may clearly understand the same, what I desire to secure by Letters Patent is as follows:

1. In an automotive vehicle, the combination of a rear fender having an aperture therein, a gasoline tank filler spout extending through said aperture from a point below said fender to a point above the same, and a tail lamp fixture secured to said fender surrounding said aperture adapted to support and conceal the portion of said gasoline tank filler spout extending above said fender.

2. In an automotive vehicle, the combination of a rear fender having an aperture therein, a gasoline tank filler spout extending through said aperture from a point below said fender to a point above the same, a tail lamp fixture secured to said fender surrounding said aperture adopted to support and conceal the portion of said gasoline tank filler spout extending above said fender, and a plate below said fender surrounding said aperture adapted to reinforce said fender over the area thereof upon which said tail lamp fixture is secured.

3. In an automotive vehicle, the combination of a rear fender having an aperture therein, a gasoline tank filler spout extending through said aperture from a point below said fender to a point above the same, a tail lamp fixture secured to said fender surrounding said aperture adapted to support and conceal the portion of said gasoline tank filler spout extending above said fender, and a partition in said tail lamp fixture dividing the portion of the fixture in which the tail lamp is located from the portion of the fixture through which the gasoline tank filler spout extends.

4. A tail lamp fixture adapted to be mounted upon a rear fender of an automobile and to support a gasoline tank filler spout comprising, a lamp body, and a lamp mounting provided with an aperture to receive said filler spout, said lamp body and lamp mounting being formed as an integral hollow casting.

5. A tail lamp fixture adapted to be mounted upon a rear fender of an automobile and to support a gasoline tank filler spout comprising, a lamp body, a lamp mounting provided with an aperture to receive said filler spout, and an imperforate partition between said lamp body and lamp mounting; said lamp body, lamp mounting and partition being formed as an integral hollow casting.

6. A tail lamp fixture adapted to be mounted upon a rear fender of an automobile and to support a gasoline tank filler spout comprising, a lamp body, a lamp mounting provided with an aperture to receive said filler spout, a flange surrounding said aperture, and a resilient bushing between said flange and the upper end of said gasoline tank filler spout.

7. A tail lamp fixture adapted to be mounted upon a rear fender of an automobile and to support a gasoline tank filler spout comprising a hollow casting, a lens securing flange in said casting, a bulb mounting flange in said casting parallel to and spaced from said lens securing flange, a partition in said casting parallel to and spaced from said bulb mounting flange upon the opposite side thereof from said lens securing flange to provide a chamber between said partition and said bulb mounting flange for the electric wiring connected with the bulb, the portion of said casting on the opposite side of said partition from said flanges being formed as a tail lamp mounting and provided with an aperture to receive the upper end of said gasoline tank filler spout.

8. A tail lamp fixture adapted to be mounted upon a rear fender of an automobile and to support a gasoline tank filler spout comprising, an annular lamp body, a lamp mounting having an angular surface adapted to conform to the contour of said fender and provided with an aperture adapted to receive the upper end of said gasoline tank filler spout, an annular chamber between said lamp body and said lamp mounting, and an imperforate partition between said chamber and said lamp mounting.

9. A tail lamp fixture adapted to be mounted upon a rear fender of an automobile and to support a gasoline tank filler spout comprising, a lamp body, a lamp mounting provided with an aperture to receive said filler spout, a window in the top of said lamp body, and an extension on said lamp body adjacent to said window adapted to provide a support for a license plate bracket; said lamp body, lamp mounting and extension being formed as an integral hollow casting.

Signed by me at South Bend, Indiana, this 15 day of September 1932.

WILLIAM A. RADKE.